June 22, 1965 K. ZAIDENER 3,190,090
ANTI-THEFT DEVICE FOR ROAD VEHICLES
Filed Feb. 15, 1962 2 Sheets-Sheet 1
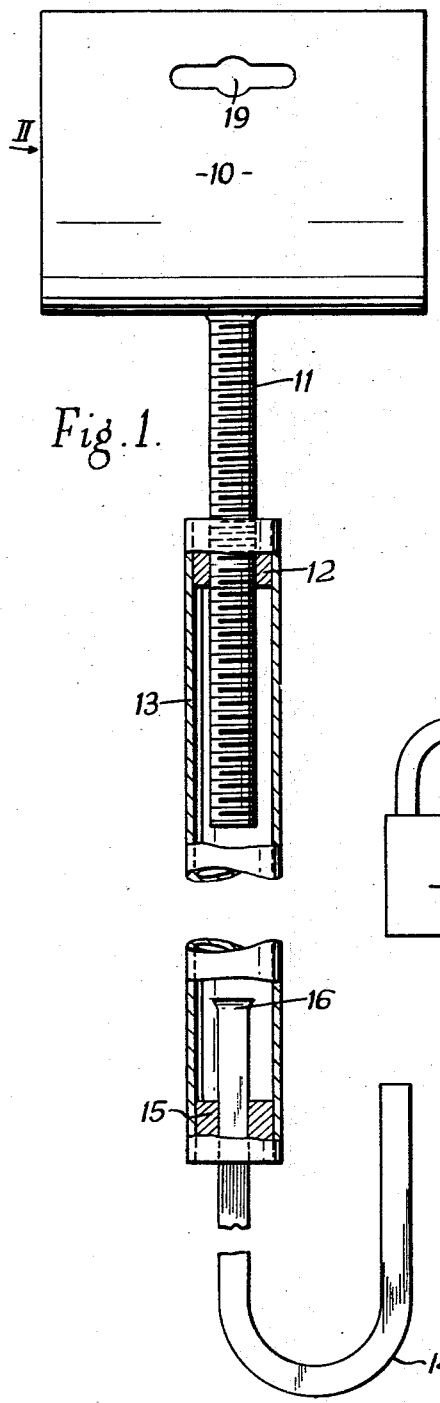
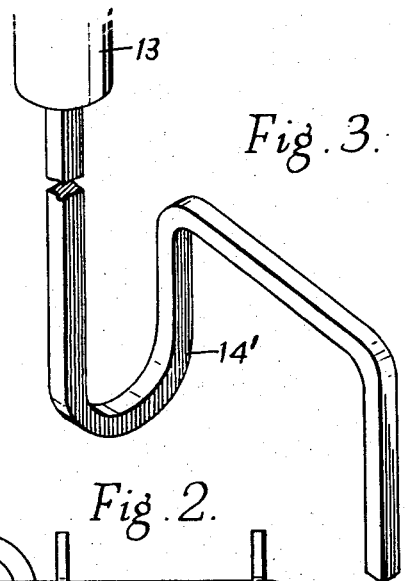
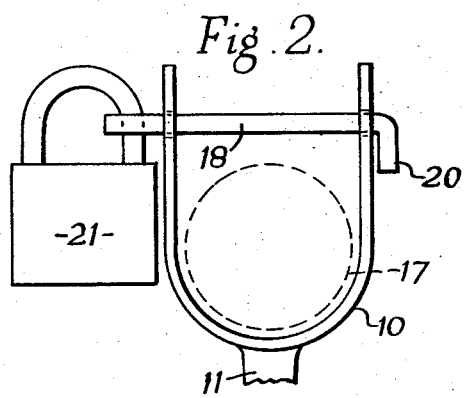
INVENTOR
Kitty Zaidener
BY Wenderoth,
Lind & Ponack,
ATTORNEYS

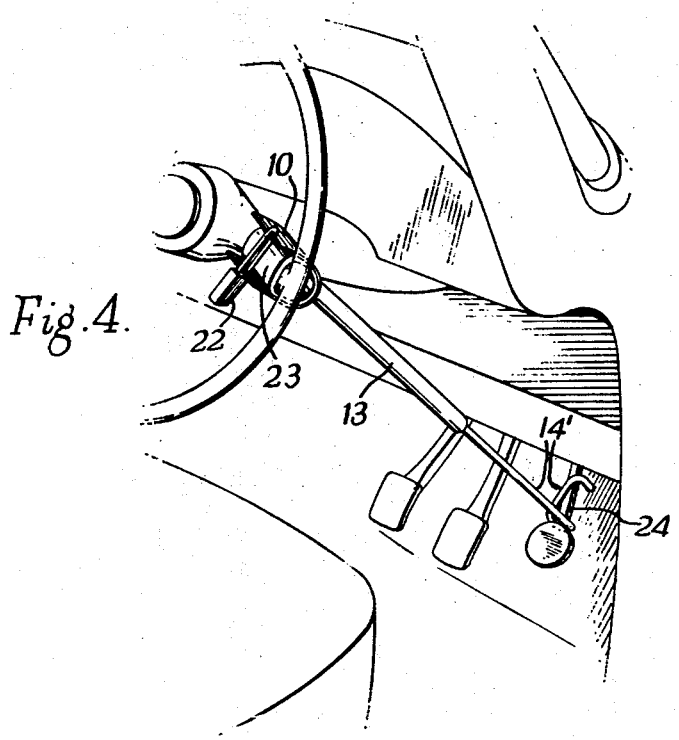

# United States Patent Office 3,190,090
Patented June 22, 1965

3,190,090
ANTI-THEFT DEVICE FOR ROAD VEHICLES
Kitty Zaidener, 7 Beresford Lodge, Beresford Road,
London, England
Filed Feb. 15, 1962, Ser. No. 173,425
3 Claims. (Cl. 70—203)

This invention relates to an anti-theft device for a road vehicle which is provided with a steering wheel.

According to the present invention there is provided, for a road vehicle having a steering wheel, an anti-theft device which can be locked in a position in relation to the steering wheel to prevent free or controlled rotary movement of the steering wheel and so prevent controlled mobility of the vehicle.

It is an object of the invention to provide a reliable anti-theft device which is of simple and inexpensive construction and is easy to apply and convenient to store.

In one form, the device comprises an elongated rod having at its upper end a channel-shaped bracket arranged to receive and hold, by means of a transverse member, a spoke or the rim of the steering wheel and having at its lower end a hooked portion arranged to hook round one of the control pedals of the vehicle. This embodiment has a wide range of application and can be used with vehicles having automatic or semi-automatic transmission. Preferably, the lower end of the rod is arranged to hook round the accelerator pedal; however, the lower end may be arranged to hook round the brake pedal or clutch pedal (if any).

Embodiments of the invention will now be described, by way of example, with reference to the accompanying drawings, in which:

FIGURE 1 is an elevation, partly in section, of an anti-theft device;

FIGURE 2 is a fragmentary view in the direction of arrow II in FIGURE 1, showing the device in the locked position;

FIGURE 3 is a fragmentary view of an alternative form of the hooked lower portion of the anti-theft device;

FIGURE 4 is a fragmentary pictorial view showing the anti-theft device in position on a motor vehicle.

Referring to FIGURE 1 of the drawings, the anti-theft device comprises a channel-shaped bracket 10 mounted on a threaded stem 11 which is in engagement with a tapped boss 12 secured in the upper end of a tubular rod 13. A hooked member 14 is slidable in a boss 15 which is secured in the lower end of rod 13. The member 14 is square in cross section as is the opening in boss 15 so that the member 14 is held against rotation in relation to rod 13; the member 14 is formed with an enlarged end 16 to prevent its removal through boss 15.

The bracket 10 is arranged to receive a spoke, indicated at 17 in FIGURE 2, of the steering wheel of a motor vehicle and a locking finger 18 extends through shaped openings 19 in the bracket to hold the spoke in the bracket. The flat finger 18 has a flange 20 at one end and an opening at the other end to receive a padlock 21. The bracket 10 and the finger 18 may have a coating of, for example, polyvinyl chloride to reduce the possibility of scratching or other damage to the steering wheel.

The hooked member, which may be a hooked member 14′ having an alternative form shown in FIGURE 3, is arranged to hook round one of the control pedals of the vehicle.

In use, the member 14 is hooked round, say, the accelerator pedal of the vehicle and the stem 11 is rotated until the bracket 10 is in the correct position to receive the spoke 17; in this position the hooked member is in its fully extended position with the enlarged end 16 abutting the boss 15. With the bracket fitted round the spoke 17 the finger 18 is slid into position and locked by means of padlock 21. When the device has been so applied, rotation of the steering wheel and depression of the accelerator are both prevented.

FIGURE 4 shows an anti-theft device in position. In this illustration, the finger 18 and padlock 21 have been replaced by a padlock 22 having an elongated hoop, and a cushion 23 of rubber or like material is provided between the bracket and the steering wheel spoke. The member 14′ is of the form shown in FIGURE 3 and is hooked around the accelerator pedal 24. As indicated, the bracket 10 may be secured to the rod 13 by means of a swivel coupling.

The device described above is of simple and robust construction. The fitting of the device is also simple, it being understood that adjustment of the stem 11 is necessary only once for each model of vehicle. Suitably, the device is stored in a convenient location within easy reach of the driver; storage is, of course, facilitated by virtue of the rod 13 and hooked member 14 being telescopic.

It is preferable that the device is locked by means of a padlock. However, in devices intended particularly for use in light motor cars a built-in locking arrangement may be provided. The various parts of the locking device are preferably formed from hardened steel.

I claim:

1. An anti-theft device for a road vehicle having a steering wheel and control pedals, the device comprising an elongated rod comprising a tubular length, a stem in screw-threaded relationship with the upper end of said tubular length, and a lower part which is in telescopic but non-rotary relationship with the tubular length, a shaped member at the lower end of the lower part which hooks around one of said control pedals, a U-shaped bracket mounted on the upper end of said stem to receive the rim of the steering wheel, and locking means including a locking finger to extend across said bracket and so prevent removal of the bracket from the wheel and lock the device in its working position where the rod extends between said part of the wheel and said control pedal.

2. An anti-theft device as claimed in claim 1 in which said lower part of the rod is non-circular in cross section and extends through a correspondingly shaped opening at the lower end of said tubular length.

3. An anti-theft device as claimed in claim 1, in which said shaped member comprises a hook.

References Cited by the Examiner
UNITED STATES PATENTS

| | | | |
|---|---|---|---|
| 1,140,141 | 5/15 | Fagan | 70—211 |
| 1,193,679 | 8/16 | Fox | 70—199 |
| 1,316,407 | 9/19 | Auperl | 70—212 X |
| 1,368,922 | 2/21 | Gerfers | 70—212 |
| 1,519,086 | 12/24 | Coffman | 70—203 |
| 1,531,062 | 3/25 | Barravecchia | 70—202 |
| 2,485,997 | 10/49 | Balais | 70—212 X |
| 2,716,336 | 8/55 | Ross | 70—238 |

OTHER REFERENCES

Publication I: "Motor," volume 92, issue 4, October 1949, page 188.

ALBERT H. KAMPE, *Primary Examiner.*